United States Patent [19]

Herman

[11] E Re. 31,076

[45] Reissued Nov. 9, 1982

[54] CIGARETTE PACKAGE

[76] Inventor: Rodney W. Herman, 1002 Glenhill Rd., St. Paul, Minn. 55112

[21] Appl. No.: 268,745

[22] Filed: Jun. 1, 1981

Related U.S. Patent Documents

Reissue of:

[64] Patent No.: 4,207,976
Issued: Jun. 17, 1980
Appl. No.: 28,562
Filed: Apr. 9, 1979

[51] Int. Cl.[3] ..... B65D 25/10

[52] U.S. Cl. ..... 206/246; 206/253; 206/256; 206/268

[58] Field of Search ..... 206/242, 246, 249, 253, 206/256, 268; 131/170 R, 175, 182, 183, 187, 231, 235 R, 237, 240 E, 256

[56] References Cited

U.S. PATENT DOCUMENTS

| | | | |
|---|---|---|---|
| 1,339,577 | 5/1920 | Roffeis | 206/246 |
| 1,562,497 | 11/1925 | Derry | 206/246 |
| 1,693,096 | 11/1928 | Samuels | 206/246 |
| 2,112,801 | 3/1938 | Zint | 206/253 |
| 2,233,324 | 2/1941 | Palmer | 206/246 |
| 2,958,417 | 11/1960 | Adams | 206/246 |
| 3,159,272 | 12/1964 | Swift | 206/246 |
| 3,319,633 | 5/1967 | Glidden | 131/237 X |
| 3,451,533 | 6/1969 | Butler | 206/246 |
| 3,888,264 | 6/1975 | Baclit | 131/235 R |

*Primary Examiner*—Joseph Man-Fu Moy
*Attorney, Agent, or Firm*—Merchant, Gould, Smith, Edell, Welter & Schmidt

[57] ABSTRACT

A cigarette package comprises a body 20. The body includes a plurality of bores 26 which are divided by a membrane 32 into a cigarette containing chamber 34 and a cigarette butt receiving chamber 36. Each chamber 34 contains an unsmoked cigarette 6. When a butt 10 is pushed into a butt receiving chamber 36, it engages and pushes an unsmoked cigarette 6 up past the top surface 28 of body 20 to allow that cigarette to be manually removed. This discourages littering of cigarette butts 10. Alternatively, body 20 can be formed so that each cigarette 6 is movable without having to store cigarette butt 10 in one of the chambers 36.

15 Claims, 6 Drawing Figures

FIG. 2
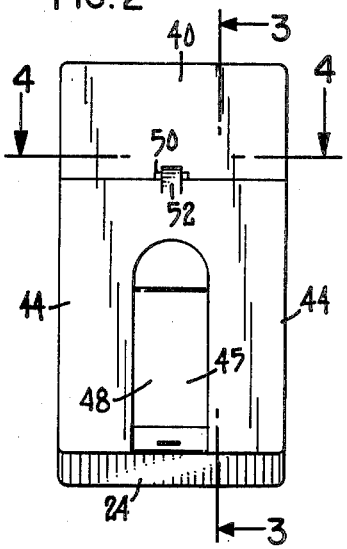
FIG. 3
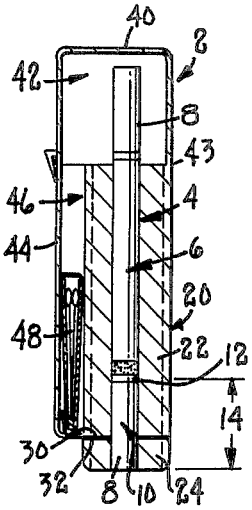
FIG. 1
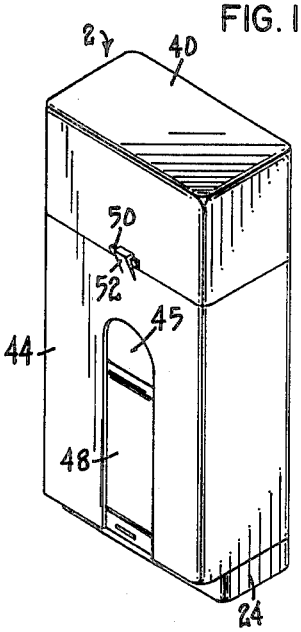
FIG. 4
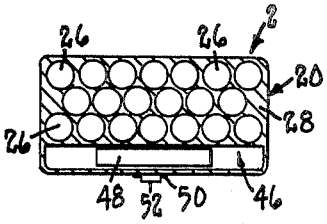
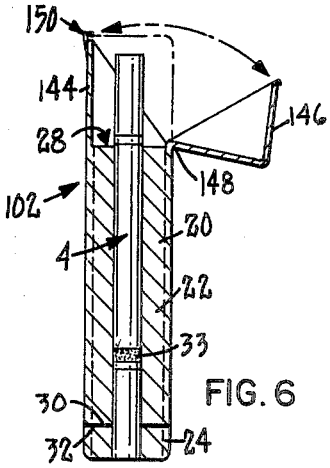
FIG. 6
FIG. 5
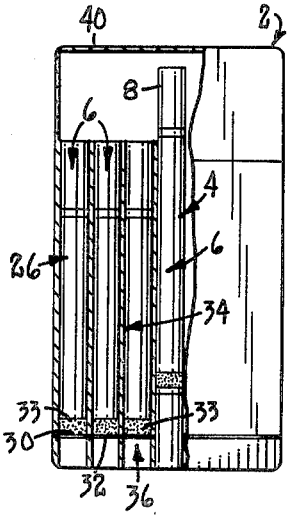

CIGARETTE PACKAGE

Matter enclosed in heavy brackets [ ] appears in the original patent but forms no part of this reissue specification; matter printed in italics indicates the additions made by reissue.

TECHNICAL FIELD

This invention relates in general to the tobacco industry and, more particularly, to the packages used for containing cigarettes or similar products.

DESCRIPTION OF THE PRIOR ART

Cigarette smoking is a widespread practice throughout the world. Cigarettes are elongated cylinders of tobacco enclosed in paper. Many cigarettes include filter portions which, unlike the tobacco, can't be smoked. Even unfiltered cigarettes are seldom smoked completely because it becomes impossible to hold a short stub of a lighted cigarette without burning one's fingers. The unsmoked portion of the cigarette, whether or not it it includes a filter, is commonly referred to as the "butt".

Cigarette butts are an unappealing by-product of cigarette smoking. For one thing, such butts pose a safety hazard if they are not thoroughly extinguished. For example, smokers sometimes toss burning cigarette butts into trash receptacles containing paper or other combustible materials. This has led in the past to fires. Such fires, expecially when they start in a private residence or home, are very serious and may lead to great property damage and to loss of life.

In addition, cigarette butts are often littered on the ground either intentionally or through force of habit. Any one who has walked the public areas of our urban centers can easily see numerous cigarette butts littering the ground. These butts not only represent an aethestic eyesore, but must also eventually be cleaned up. Insofar as they contribute to the maintenance costs incurred by cities, they represent a drain on our civic financial resources in an economic period in which city budgets are increasingly squeezed.

Smokers who litter their cigarette butts often do so, not because they are motivated by a desire to consciously litter, but for want of a better alternative. Trash receptacles in many of our cities are infrequent or filled to overflowing. Thus, a smoker who is walking through the city streets often has no alternative but to discard his cigarette butts on the ground. The same incidentally is true with regard to the cellophane package in which cigarettes are usually contained. These too are often found littering our city streets.

What is true on a public scale is often true on a private scale. Many households in our country may have certain family members who are smokers while other family members are not. While households usually contain one or more ashtrays for use by the smoker, such ashtrays are not a perfect solution to the problem of the disposal of cigarette butts. For one thing, the ashtrays become filled and must be periodically emptied. When the ashtrays are filled, they may not be pleasing to those family members who are not smokers themselves and who may object, sometimes quite strongly, to even the mere sight of cigarette butts littering the ashtrays of the house. Thus, the proper disposal of cigarette butts is a problem which has plagued us both on a public and private scale.

Numerous cigarette containing cases or packages have been proposed for containing cigarettes. Some of these devices include ejectors for assisting the smoker in expelling a cigarette from the package. For example, U.S. Pat. Nos. 1,897,702 and 1,987,519 disclose typical cigarette dispensing cases having manually operated ejectors. Other devices have been developed for allowing the amoker to extinguish the cigarette butt in the package itself. U.S. Pat. No. 2,606,562 to Siegel is one example. Unfortunately, to the best of applicant's knowledge, there is no cigarette package which also encourages and allows the smoker, by virtue of its very construction, to store the cigarette butts therein, rather than litter those butts on the ground or place them into ashtrays or the like.

SUMMARY OF THE INVENTION

The present invention relates to an improved cigarette package which encourages, and indeed, requires that each cigarette butt be properly stored inside the package itself. This invention thus obviates the disadvantages of the prior art and incorporates a novel structure and method for discouraging the littering of cigarette butts.

The present invention relates to a cigarette package which comprises a body. The body includes means for holding the cigarettes in a generally upright position. A portion of the holding means includes a passageway which encircles at least a portion of the cigarette and which opens on one of the exterior sides of the body. One end of each cigarette is normally flush with a dispensing surface of the body through which the cigarette will be dispensed. In addition, each passageway includes means for preventing the cigarettes contained therein from falling out of the open end.

One cigarette in each new package is located with its end extended past the dispensing surface to allow it to be freely withdrawn from the package. Then, to remove an additional cigarette, the smoker must store the butt from the cigarette he has just smoked in one of the passageways in which a new unsmoked cigarette is contained. As the cigarette butt is pushed into this passageway through the open end thereof, the butt engages and causes the new, unsmoked cigarette to be extended past the dispensing surface of the body. This allows the smoker to grasp this cigarette whenever he desires to smoke it.

BRIEF DESCRIPTION OF THE DRAWINGS

This invention will be described in more detail in the detailed description, when taken in conjunction with the following drawings, in which like reference numerals refer to like elements throughout.

FIG. 1 is a perspective view of the exterior surface of an improved cigarette containing package according to a first embodiment of this invention;

FIG. 2 is a front plan view of an improved cigarette package shown in FIG. 1;

FIG. 3 is a cross-sectional view of the improved cigarette package shown in FIG. 1, taken along lines 3—3 of FIG. 2.

FIG. 4 is a cross-sectional view of the improved cigarette package shown in FIG. 1, taken along lines 4—4 of FIG. 2;

FIG. 5 is a front elevational view of the improved cigarette package shown in FIG. 1, partially broken away to show an unsmoked cigarette and a cigarette butt contained in one of the vertically extending passageways of the body; and FIG. 6 is a cross-sectional view of a second embodiment of an improved cigarette package according to this invention.

DETAILED DESCRIPTION

Referring now to FIGS. 1–5, a first embodiment of an improved cigarette package according to this invention is generally illustrated as 2. Cigarette package 2 has two functions. It contains a plurality of unsmoked cigarettes which may be manually removed one by one from the package for smoking. In this regard, cigarette package 2 is like the other types of cigarette packages which have been known heretofore. In addition, however, cigarette package 2 also stores the cigarette butts which are left after each of the cigarettes is smoked.

An unsmoked cigarette is illustrated in the drawings as 6. Cigarette 6 includes a cylinder 4 of tobacco with a filter tip 8 at one end. The cigarette butt is generally illustrated as 10. Cigarette butt 10 usually comprises the filter tip 8 and also a small remaining unsmoked portion 12 of the tobacco cylinder 4. Normally, each cigarette butt 10 will have an average length illustrated as 14. This average length 14 is usually at least as long as the filter tip 8 and somewhat slightly longer because of the unsmoked portion 12 of cigarette 6. However, even for cigarettes 6 which do not include a filter tip 8, the cigarette butt 10 usually has an average length 14 which is substantial because the cigarette 6 cannot be completely smoked without burning one's fingers.

Cigarette package 2 comprises a solid, rectangular body 20. Body 20 is defined by an upper body section 22 releasably secured to a lower body section 24. Preferably, body 20 is substantially rigid to allow it to be crushproof. Body 20 may be made from any suitable materials, but is preferably formed from sufficiently hard plastic materials.

Body 20 includes a means for holding each of the unsmoked cigarettes 6 in a generally upright position. This cigarette holding means includes a plurality of vertically extending passageways or bores 26. Each bore 26 encircles at least a portion of, and preferably the entire length of, an unsmoked cigarette 6. Bores 26 are sized to retain the cigarettes 6 therein in a friction type fit such that the cigarettes would not fall out of the bores 26 even if package 2 were inverted. Bores 26 are arranged parallel to one another and extend entirely through body 20, i.e. through both the upper and lower body sections 22 and 24. Bores 26 are open on both the top surface 28 of body 20 and the bottom surface 30. While bores 26 have been shown vertically arranged in the body 20, it would be possible to arrange them in a horizontal orientation with the bores 26 being open in two opposed sides of the body 20.

A thin, flexible membrane 32 is located between the upper and lower body sections 22 and 24. The membrane 32 is a unitary sheet of any suitable material which is also burnable, such as a polyethylene plastic. The membrane 32 is shaped to coincide with the rectangular cross-section of the upper and lower body sections 22 and 24 to interrupt or divide each of the bores 26 into two sections. In addition, a small piece or wad of nonflammable material generally indicated as 33 is normally located in each bore 26 immediately above the membrane 32 (see FIG. 5). The extinguishing material 33 will serve to engage the lighted end of a cigarette butt 10 to extinguish the same in a manner to be described hereafter.

As noted previously, membrane 32 divides each bore 26 into two sections, namely the sections of the bores 26 which are contained respectively in either the upper or lower body sections. That section of the bore which is contained in the upper body section 22 may be referred to as a cigarette containing chamber 34. Chamber 34 is at least as long as the length of an unsmoked cigarette 6 so that the cigarette is normally completely enclosed in chamber 34. As shown in FIG. 5, this means that the upper end of the unsmoked cigarette 6 is flush with or slightly below the level of the top surface 28 of body 20. This top surface 28 may be referred to as a dispensing surface through which each of the cigarettes may be dispensed in a manner noted hereafter. Similarly, that section of each bore 26 in the lower body section 24 may be referred to as a cigarette butt receiving chamber 36. However, as is apparent from the drawings, the chamber 36 is quite small and has a length which is significantly less than the average length 14 of a cigarette butt. Both the cigarette containing chamber 34 and the butt receiving chamber 36 are open at their outer ends, i.e. at the ends opposed to the membrane 32, for a purpose to be described hereafter.

Body 20 has been described herein as being made from two sections 22 and 24 solely for ease of manufacture of body 20. In other words, when body 20 is made from two sections such as these, insertion of the dividing membrane 32 between the sections to divide the bores 26 into the chambers 34 and 36 is simplified. All that is required is that the separate body sections be spread apart, the membrane 32 inserted between the sections, and the sections then suitably secured together by any conventional attachment. For example, the sections could be glued together, sonic welded or secured together by conventional threaded attachments such as screws. When a releasable attachment between the sections is used, it allows the sections to be later separated for the insertion of a new membrane when so required. Alternatively, body 20 could be made integrally if so desired in which case the membrane 32 would be inserted during the process of manufacture of body 20.

The body 20 as described heretofore comprises a relatively rigid member containing a plurality of elongated bores 26 therein. This is the basic construction of package 2 which is essential for the present invention as described in more detail hereafter. However, a number of other optional features could also be included in body 20. For example, a lid generally illustrated as 40 could be attached to the upper end of body 20 for enclosing the upper end of the cigarettes 6. Lid 40 as shown in the drawings comprises a hollow, rectangular cover which defines an access area or space 42 adjacent the top surface 28 of body 20. Lid 40 is preferably formed integrally with the upper body section 22 and may be pivotally mounted relative thereto as at 43. The pivotal connection 43 results simply from a thin wall construction of lid 40 which construction forms a hinged joint at 43 where the lid 40 connects with the upper body section 22. However, other pivotal connections could be substituted here.

In addition to lid 40, the upper body section 22 can also include an upwardly opening pocket 44 contained on the side of the body section 22 opposite the hinged joint 43. The pocket 44 defines an upwardly opening space 46 into which a book of matches 48 or the like may be stored. Pocket 44 could have a finger slot 45 therein, as shown in FIGS. 1 and 2, to allow the user to insert his finger therethrough to aid in the insertion and withdrawal of the book of matches 48. The lid 40 is provided with a hook or catch means 50. The hook 50 on lid 40 coacts with a prong-type latch 52 located on the upper edge of pocket 44. When the latch 52 is engaged with the hook 50, the lid 40 will be closed to cover the top of body 20 and protect any of the cigarettes which have been extended into the access area 42 of lid 40. However, to gain access to the upper end of the cigarettes, the latch 52 may be released and the lid 40 pivotted along the joint 43 to uncover the top surface 28. As shown in FIGS. 1-5, the lid 40 and pocket 44 renders the cigarette package 2 somewhat thicker than the width of the body 20. This increase in thickness is necessary to allow the lid 40 to be pivotted to one side of the body 20 without having the lid engage and break off the upper ends of any cigarettes 6 which have been pushed out of one of the bores 26 as shown in FIG. 3.

In a preferred method of using cigarette package 2 to discourage the littering of cigarette butts, the package 2 will initially be filled with cigarettes 6. One cigarette 6 will be contained inside each of the cigarette containing chambers 34. However, each cigarette is retained inside the chamber 34 by the burnable membrane 32 which closes the lower end of chamber 3. One cigarette 6 is preferably initially located with its upper end being protruded up past the dispensing or top surface 28 of body 20 into the access area 42 defined by lid 40. When the lid 40 is then pivotted to an open position to uncover the top surface 28 of body 20, the smoker can then grab the upwardly protruding end of the cigarette 6 and withdraw that cigarette for smoking thereof. Assuming, however, that the cigarette has been smoked, the smoker will then be presented at some point with the cigarette butt 10 remaining after cigarette 6 is smoked.

With package 2 of the present invention, each cigarette butt 10 is simply stored in one of the butt receiving chambers 36. This is done by inserting the cigarette butt 10 into the open end of the bore 26 on the lower surface 30 of body 20. Preferably, the lighted or smoldering end 12 of the cigarette butt 10 is pushed first into the butt receiving chambers 36. There is no danger of fire however since the body 20 is preferably constructed of material which is non-flammable. By then pushing the cigarette butt 10 upwardly in the butt receiving chamber 36, the lighted or smoldering end 12 of butt 10 will engage the burnable membrane 32. The lighted end 12 of the butt 10 will then burn through membrane 32 until it engages the wad 33 of extinguishing material which is positioned immediately above the membrane 32. If the end 12 of the butt 10 is not lighted or smoldering, butt 10 is still able to fracture or push through the membrane 32. In any event, engagement of the end 12 of butt 10 with the wad of extinguishing material will serve to completely extinguish the cigarette butt 10 when it is still lighted by virtue of depriving the lighted end of butt 10 of any of the oxygen which is needed for continued combustion.

Cigarette butt 10 when pushed into the butt receiving chamber 36 will pass through the membrane 32 at least partially into the cigarette containing chamber 34. This is due to the fact that the butt receiving chamber 36 is much shorter than the average length 14 of the butts 10. As the butt 10 is received in the cigarette containing chamber 34, the upper end of a new unsmoked cigarette 6 is protruded upwardly past the top surface 28 of body 20 and into the access area 42 of the lid 40. This of course assumes that the cigarette butt 10 has been pushed into one of the butt receiving chambers 36 which underlies one of the cigarette containing chambers 34 which still holds an unsmoked cigarette 6. This can be ensured by careful visual inspection of each butt receiving chamber 36 before the cigarette butt 10 is inserted into one of the chambers. Thus, the very act of inserting a cigarette butt 10 into the butt receiving chamber 36 forces a new cigarette 6 upwardly to a position where it can be removed from the package 2 for smoking.

The cigarette package 2 of the present invention discourages littering of cigarette butts primarily because the smoker has to store each cigarette butt 10 in the package 2 in order to get access to an unsmoked cigarette 6. The smoker is required to properly store each of his cigarette butts 10 if he wishes to retrieve any additional unsmoked cigarettes 6 from the package. The last cigarette butt 10 which is produced by the smoking of the last cigarette 6 can be stored in the butt receiving chamber 36 which underlies the cigarette containing chamber 34 that initially contained the very first cigarette which was removed from the package 2 and which had been pre-extended from body 20. In addition, package 2 is also advantageous in that it includes means for properly extinguishing each cigarette butt 10, i.e. a wad 33 of extinguishing material, as it is being stored in the package 2. This greatly diminishes the danger of fire and ensures that lighted cigarette butts 10 will not be carelessly discarded in trash receptacles where they are likely to start fires.

Cigarette package 2 as described heretofore is preferred since it allows a convenient means for storing the cigarette butts 10 which incorporates at the same time an inducement for preventing the littering of the butts 10. This inducement lies primarily in the fact that storage of the cigarette butts 10 is necessary in order to retrieve additional cigarettes 6 from the package. However, if so desired, the length of the cigarette containing chambers 34 could be made shorter than the length of the unsmoked cigarette 6. This would mean that each cigarette 6 in package 2 would be immediately accessible and would protrude into the access area 42 of lid 40 without the necessity of having any of the cigarette butts 10 stored in the butt receiving chambers 36. Furthermore, in such an alternative embodiment, each of the butt receiving chambers 36 could also be elongated to be approximately the same length as the average length 14 of the butts 10 since movement of the butt 10 into the cigarette containing chamber 34 would no longer be required to dispense any of the cigarettes 10. The wad 33 of extinguishing material could then be glued or otherwise fixedly secured to the membrane 32 at the top of the butt receiving chamber 36 rather than being located in the bottom of the cigarette containing chamber 34.

In a preferred method of operation, the Applicant envisions that cigarette package 2 would form part of the original package in which cigarettes 6 will be packed at the factory. Package 2 can be made from a relatively permanent and non-crushable material, e.g. plastic, which could be recycled for a plurality of uses. It would then be desirable to seal each package 2 with a deposit paid to the retailer on the package 2 at the time of purchase. This deposit would be similar to that deposit paid on returnable bottles used in the sale of soda pop and similar goods. When the smoker smokes all of the cigarettes 6 in the package 2 and has properly placed all the butts 10 in the chambers 36, the package could then be returned to a retail outlet where similar packages are sold. The deposit initially paid on the package 2 would then be returned to the smoker. The packages would then be forwarded by the retailer to the cigarette manufacturer for emptying of the cigarette butts 10 from package 2, sterilization of the package 2, and refilling of the package 2 with new cigarettes. This method would also ensure that the cigarette packages 2 themselves would not be discarded or littered after they are totally filled with cigarette butts 10. This may be a desirable feature under certain conditions. However, cigarette package 2 need not necessarily be made as an original piece of equipment which is used by the manufacturer to package cigarettes 6. Instead, it could be manufactured and sold as an accessory item. A smoker who first buys a normal package of cigarettes could then remove the cigarettes therefrom and properly store them in the elongated bores 26.

A second embodiment of the cigarette package according to this invention is shown in FIG. 6 as 102. The embodiment of FIG. 6 is generally identical to that of package 2 except for the configuration of the lid, which will be illustrated as 140 in FIG. 6. In the embodiment of FIGS. 1–5, the lid 40 is shown wider than body 20 to allow the cigarettes to be extended upwardly into the access area 42, but yet allow the pivotal lid 40 to pivot to a position allowing access to those cigarettes without breaking off the upper ends of the cigarettes 6 during the pivotting movement. The use of a wider lid also allows one to use the pocket 44 on one side of the body 20. However, this embodiment may be somewhat more expensive to produce because of the additional material which is required for the wider lid 40 and the pocket 44.

In the cigarette package 102 shown in FIG. 6, the pivotal lid 140 is shown as being the same width as body 20. However, in order to allow the pivotting movement of the lid 140 without engaging and breaking off the upper end of cigarettes 6, the lid 140 is cut away at a 45° angle relative to the body. Thus, one half 144 of the lid 140 will remain fixed to the body 20 while the other half 146 of the lid 140 pivots relative thereto. The pivotal half 146 of lid 140 can be pivotally mounted on the upper end of body 20 as at 148 in a manner similar to the mounting of pivotal lid 40. In addition, a latch and hook means generally illustrated as 150 can be used between the fixed half 144 of the lid and the pivotal half 146 to secure the pivotal half of the lid in a closed position. The positions of the pivot point for the pivotal lid half 144 and the latch and hook means 150 could be reversed if so desired.

Another alternative type of cigarette package 2 which is not shown in the drawings relates to that embodiment where all of the cigarettes 6 have their upper ends located above the surface 28 of body 20. In such an embodiment, it would be possible for the bores 26 to be entirely closed at their bottom end or, in other words, to be blind bores. Each cigarette butt 10 could be inserted back into the bore 26 from which the unsmoked cigarette 6 was just withdrawn. This embodiment is advantageous since it allows cigarette package 2 to more closely approximate the size of conventional cigarette packages of this type. In addition, it is somewhat simpler and less expensive since the cigarette butts 10 will be extinguished merely by inserting them into the top and downward into one of the bores 26. In this embodiment, there is no need for a wad of extinguishing material 33 or the membrane 32. Various other modifications of this invention will be apparent to those skilled in the art. Thus, the scope of this invention is to be limited only by the appended claims.

What is claimed is:

1. An improved cigarette package for containing a plurality of elongated cigarettes, which comprises:

(a) a body;

(b) means contained in the body for holding the cigarettes in a generally upright position, in which the holding means includes a plurality of passageways for respectively encircling at least a portion of each cigarette for supporting that cigarette in a generally upright position;

(c) means located in each passageway for retaining the cigarette therein until it is removed from the package for smoking;

(d) wherein each passageway has an open end located on an exterior side of the package such that one cigarette butt may be inserted into a passageway through the open end thereof for retaining a number of cigarette butts in the package corresponding to the number of passageways; and (e) wherein the body has a dispensing surface which includes a plurality of outlet openings encircling the upper end of the cigarettes therein; wherein each cigarette is normally contained in the body with its upper end being flushed with the dispensing surface and its lower end being contained in one of the passageways, and wherein the passageways and outlet openings are aligned so that a cigarette butt received in a passageway containing a cigarette will push the top end of the cigarette past the dispensing surface to render the cigarette accessible for manual removal.

2. An improved cigarette package which discourages littering of cigarette butts and which initially contains a plurality of unsmoked cigarettes therein, which comprises:

(a) a body;

(b) a plurality of elongated bores contained in the body each of which is adapted to contain one unsmoked cigarette therein, wherein the bores have a total length which is longer than that of an unsmoked cigarette and are open on two opposed sides of the body; and (c) means for dividing each bore into an unsmoked cigarette containing chamber and a butt receiving chamber, wherein the cigarette containing chamber is sufficiently long to completely enclose the unsmoked cigarette and the butt receiving chamber has a length which is less than the average length of the cigarette butts, and wherein the chambers are aligned and the dividing means is configured to allow a cigarette butt to pass at least partially into the cigarette containing chamber, whereby a cigarette butt may be pushed into one of the butt receiving chambers beneath an unsmoked cigarette and when completely contained therein will push one end of the unsmoked cigarette out of the cigarette containing chamber to allow manual removal of that cigarette.

3. An improved cigarette package as recited in claim 2, in which the dividing means comprises a burnable membrane which extends across each of the cigarette containing bores at a point intermediate the ends thereof, whereby each cigarette butt is able to pass through the membrane to move at least partially into the cigarette containing chamber.

4. An improved cigarette package as recited in claim 2, further comprising means located in each bore for extinguishing the cigarette butt which has been pushed into the butt receiving chamber.

5. An improved cigarette package as recited in claim 4, wherein the extinguishing means is located in the bottom of each of the cigarette containing chambers adjacent the dividing means.

6. An improved cigarette package as recited in claim 4, in which the extinguishing means comprises a non-flammable material for engaging and extinguishing the cigarette butt.

7. An improved cigarette package as recited in claim 2, in which the body comprises upper and lower body sections secured together which respectively define the cigarette containing chamber and the butt receiving chamber, and wherein the dividing means is located between the upper and lower body sections and extends across all of the bores therein.

8. An improved cigarette package as recited in claim 2, in which the body includes a lid for normally enclosing that side of the cigarette containing chamber through which the unsmoked cigarettes are dispensed.

9. An improved cigarette package as recited in claim 8, in which the lid includes an access area located adjacent to the cigarette containing chamber of the bores for receiving the end of the unsmoked cigarette which has been extended out of the cigarette containing chamber, and wherein at least a portion of the lid is pivotably mounted relative to the body to open and close the access area to allow access to the cigarette.

10. An improved cigarette package as recited in claim 9, wherein the lid is cut away at a 45° angle relative to the body such that one half of the lid is fixed relative to the body and the other half of the lid comprises the pivotal portion thereof.

11. An improved cigarette package as recited in claim 2, in which the body is substantially rigid.

12. An improved method for discouraging the littering of cigarette butts, which comprises:

(a) providing a cigarette package which includes means for containing a plurality of unsmoked cigarettes and means for receiving and storing a similar number of cigarette butts;

(b) normally totally enclosing all of the unsmoked cigarettes except for one inside the cigarette package in an inaccessible position with the one unsmoked cigarette protruding at least partially from the package thereby allowing the one unsmoked cigarette to be freely withdrawn from the cigarette package for smoking thereof; and (c) pushing each of the unsmoked cigarettes to a position at least partially outside the package through the act of storing one of the cigarette butts in the package thereby allowing each of the remaining unsmoked cigarettes in the package to be individually withdrawn from the package only when a previously smoked cigarette butt is first stored therein.

13. An improved method as recited in claim 12, in which the withdrawal allowing step comprises preventing access to each remaining cigarette until a corresponding cigarette butt has been stored in the package.

14. An improved method as recited in claim 12, further comprising the step of encouraging the smoker to return the package which has been filled with cigarette butts for emptying and refilling thereof by requiring a deposit on the sale of each new cigarette package which is filled with unsmoked cigarettes, which deposit is refunded upon return of the package.

*15. An improved cigarette package for containing a plurality of elongated cigarettes, which comprises:*

*(a) a body;*

*(b) means contained in the body for holding the cigarettes in a generally upright position in which the holding means includes a plurality of passageways for respectively encircling at least a portion of each cigarette for supporting that cigarette in a generally upright position;*

*(c) means located in each passageway for retaining the cigarette therein until it is removed from the package for smoking, said retaining means including a burnable membrane extending across each passageway and a wad of non-flammable material in each passageway intermediate said membrane and the cigarette retained in the passageway;*

*(d) wherein each passageway has an open end located on an exterior side of the package such that one cigarette butt may be inserted into a passageway through the open end thereof for retaining a number of cigarette butts in the package corresponding to the number of passageways; and*

*(e) wherein each of said membranes is spaced proximate one of said open ends of said passageways so that cigarette butts inserted through said open ends can burn through said membranes and be extinguished by said wads.*

* * * * *